US006470288B1

(12) United States Patent
Keidel et al.

(10) Patent No.: US 6,470,288 B1
(45) Date of Patent: Oct. 22, 2002

(54) DISPENSER WITH UPDATABLE DIAGNOSTIC SYSTEM

(75) Inventors: Murl J. Keidel; Michael L. Bolton; Kenneth D. Young, all of Fort Wayne, IN (US)

(73) Assignee: Tokheim Corporation, Fort Wayne, IN (US)

( * ) Notice: Subject to any disclaimer, the term of this patent is extended or adjusted under 35 U.S.C. 154(b) by 0 days.

(21) Appl. No.: 09/336,653

(22) Filed: Jun. 18, 1999

(51) Int. Cl.7 ................................................ G06F 19/00

(52) U.S. Cl. ......................... 702/122; 705/50; 705/413; 222/27

(58) Field of Search ........................... 702/50, 51, 122, 702/123, 45, 55, 57; 705/413; 186/39, 59; 222/26, 27, 15, 16

(56) References Cited

U.S. PATENT DOCUMENTS

| | | | | |
|---|---|---|---|---|
| 3,894,658 A | | 7/1975 | Buell, Jr. | 222/26 |
| 3,897,887 A | * | 8/1975 | Goldberg | 222/26 |
| 3,927,800 A | * | 12/1975 | Zinsmeyer et al. | 222/26 |
| 4,290,538 A | | 9/1981 | White et al. | 222/25 |
| 4,360,877 A | * | 11/1982 | Langston et al. | 705/413 |
| 5,027,282 A | | 6/1991 | Hollidge | 700/232 |
| 5,482,139 A | * | 1/1996 | Rivalto | 186/36 |
| 5,535,130 A | * | 7/1996 | Long | 700/231 |
| 5,586,050 A | | 12/1996 | Makel et al. | 702/51 |
| 5,596,501 A | * | 1/1997 | Comer et al. | 705/413 |
| 5,612,890 A | | 3/1997 | Strasser et al. | 700/241 |
| 5,615,133 A | | 3/1997 | Gillard et al. | 702/123 |
| 5,694,326 A | * | 12/1997 | Warn et al. | 700/231 |
| 5,798,931 A | | 8/1998 | Kaehler | 700/231 |
| 5,913,180 A | * | 6/1999 | Ryan | 702/45 |
| 6,082,618 A | * | 7/2000 | Brown | 235/381 |
| 6,169,938 B1 | * | 1/2001 | Hartsell, Jr. | 141/98 |

* cited by examiner

*Primary Examiner*—Marc S. Hoff
*Assistant Examiner*—Mohamed Charioui
(74) *Attorney, Agent, or Firm*—Randall J. Knuth

(57) ABSTRACT

A remote adjustable fuel dispenser for dispenser diagnostics and remote telecommunication. The fuel dispenser contains a remote communication system for communication between the fuel dispenser and a remote telecommunication device. A wireless input device, such as a keyboard, mouse, or hand-held computer is in wireless communication with a fuel dispenser for use during fuel dispenser diagnostics.

41 Claims, 2 Drawing Sheets

DISPENSER WITH UPDATABLE DIAGNOSTIC SYSTEM

BACKGROUND OF THE INVENTION

1. Field of the Invention

The present invention relates to a remote addressable fuel dispenser system, and in particular, an interactive fuel dispenser with remote telecommunication functionality and connectivity.

2. Description of the Related Art

Traditional fuel dispensers contain a fuel pump, a fuel meter, and a display screen to display the quantity and cost of fuel being dispensed. In addition, many of the fuel dispenser's manufactured today contain a "pay-at-the-pump" feature. This feature allows customers to pay for fuel and conduct other transactions directly at the fuel dispenser. A central processor or CPU integrates the fuel components, such as pump, meter, and display, along with pay-at-the-pump components such as a credit card or ATM (automatic teller machine) debit card reader. The central processing unit runs an operating system and other software in order to perform the function of integrating the various components of the dispenser.

One problem with current fuel dispensers is the inability to connect a wireless input device, such as a keyboard or mouse, to a fuel dispenser for running diagnostics. Current fuel dispenser designs traditionally require permanent connection to another computer to run diagnostic software or to monitor the functionality of individual fuel dispenser components. For example, a technician at an in-store Point-of-Sale (POS) computer/server can access the permanently connected fuel dispenser diagnostics. Alternately, a technician physically at the fuel dispenser can have access to the dispenser for diagnostics through a direct wired connection.

A second problem with current fuel dispensers is the inability to run the most current or up to date diagnostic software for diagnostics of the fuel dispenser system software and individual fuel dispenser components. Traditionally, diagnostic software is either permanently stored on ROM or other suitable means within the fuel dispenser or on the Point-of-Sale (POS) computer/server. Consequently, a technician servicing the fuel dispenser has access only to the built-in diagnostic software of the fuel dispenser or the diagnostic software stored on the POS computer.

Another problem with current fuel dispensers is the inability to update system, operational and diagnostic software to the most current versions. Traditionally, fuel dispenser software is either permanently stored on ROM or equivalent storage means within a fuel dispenser. Alternatively, diagnostic software may be maintained on the POS computer/server. For example, if the diagnostic software is maintained on ROM or similarly permanent storage means, the only way to update the diagnostic software would be to replace the ROM. Alternatively, if the diagnostic software is stored on the POS server, system diagnostic software update versions must first be downloaded to the server before being able to execute the diagnostics on the fuel dispenser.

Another problem with current fuel dispensers is the inability to have the fuel dispenser operate as a fully functional automatic teller machine (ATM). Many modern fuel dispensers manufactured today have pay-at-the-pump functionality which allows a customer the ability to purchase fuel and other convenient store and fast food items while at the fuel dispenser. However, fuel dispensers today do not operate as a fully functional ATM machine for allowing customers to receive legal tender in the form of cash being dispensed from the fuel dispenser.

Another limitation of current fuel dispensers is the inability to have a fuel dispenser function as a kiosk device. Currently kiosk devices operate allowing customers to have telecommunications connections to the internet, voice telephone connection, and integrated audio/video teleconferencing, or other telephony connection.

SUMMARY OF THE INVENTION

The present invention provides a remote addressable fuel dispenser with telecommunications connection for interactive communication. The fuel dispenser contains a processor means operably connected to fuel dispenser components, such as a fuel pump, meter, and a display or output device. The fuel dispenser may contain a wireless input device, such as a wireless keyboard, mouse, or other peripheral, which is in wireless communication with the processor means. The wireless input device may be used by a service technician to run fuel dispenser diagnostics while the technician is physically at the fuel dispenser. In addition, the fuel dispenser may contain a remote communication means for remote telecommunications between the fuel dispenser and a remote telecommunication device.

The invention, in one embodiment, is a remote addressable fuel dispenser system for fuel dispenser diagnostics and remote telecommunication. The remote addressable fuel dispenser system includes at least one fuel dispenser component. A processor is operably connected to the fuel dispenser component and runs dispenser system software. A wireless input device is in operable communication with the processor by a wireless connection system. In one particular further embodiment, a remote communication system is used for remote telecommunication. In a further embodiment, the fuel dispenser is in operable communication with one of a bank server and a bank computer network.

The invention, in another embodiment thereof, consists of a remote addressable fuel dispenser for fuel dispenser diagnostics and remote telecommunication. The remote addressable fuel dispenser system has at least one fuel dispenser component. A processor is in operable communication with the fuel dispenser component and runs dispenser system software. A remote communication system is used during fuel dispenser diagnostics.

The invention, in yet another form thereof, is a remote addressable fuel dispenser system for remote telecommunication. The remote addressable fuel dispenser system has at least one fuel dispenser component. A processor is in operable communication with the fuel dispenser component. The processor runs dispenser system software. A remote communication system is used for telecommunication.

An advantage of the present invention is the ability to connect a wireless input device to the fuel dispenser. The wireless input device can be used while performing the function of fuel dispenser diagnostics. There is no physical connection between the wireless input device and the fuel dispenser.

Another advantage of the present invention is a remote addressable dispenser. The remote addressability permits direct remote communication system for communication between the fuel dispenser and a telecommunication device. The direct communication allows one to "call-in", access, or log-into the fuel dispenser from a remote location. The communication is made directly to the addressable dispenser and not through a POS (point-of-sale) computer/server. When the remote telecommunication device is a remote computer/server containing fuel dispenser diagnostic software, a technician is able to perform diagnostics on the fuel dispenser while in communication with a remote computer. In addition, the remote communication system may be used for communicating between the fuel dispenser and a bank computer network or the local phone system for placing local and long distance telephone calls.

Another advantage of the present invention is the ability to run the most current diagnostic software on a fuel dispenser. Through a remote communication system, a technician is able to run the most current diagnostic software, which may be located on a remote computer/server.

An additional advantage of the present invention is that the technician needs only to update the diagnostic software on the remote server rather than on each individual fuel dispenser.

Yet another advantage of the present invention is the ability to run diagnostic functions on a fuel dispenser from a remote or off-site location. A technician is able to access the fuel dispenser through the remote communication system. For example, a technician at a remote or off-site location, using a remote computer or server, can access or log into the fuel dispenser in which diagnostics are to be run. From that remote location, the technician has access to data from the fuel dispenser which can be uploaded from the fuel dispenser through the remote communication system to the remote computer. Similarly, the technician is able to download information from the remote server to the fuel dispenser.

Another advantage of the present invention is the ability for a technician to have access to the most current fuel dispenser diagnostics while on-site or physically at the fuel dispenser. The technician can use a wireless input device, such as a wireless keyboard, mouse, hand-held device, or similar peripheral. Through this wireless input device, the technician has access to control functions of the fuel dispenser, and fuel dispenser's components and to run diagnostics. The technician is able to communicate with a remote computer through the remote communication system. By using the wireless input device, the technician is able to access the diagnostic software located on the remote computer for use in fuel dispenser diagnostics.

Yet another advantage of the present invention is the ability to update dispenser system software on the fuel dispenser. Fuel dispenser system software updates can be initiated by several different mechanisms. A technician at a remote location, using a remote computer, can access the fuel dispenser through the remote communication system and subsequently download the new system software. Alternatively or in addition to, a technician physically located at the fuel dispenser can use the wireless input device to initiate communication with a remote computer and download new system software applications. Consequently, the fuel dispenser then has the ability to run the most current dispenser system software.

Another advantage of the present invention is the ability for the fuel dispenser to operate as a fully functional bank automatic teller machine (ATM). The fuel dispenser, via the remote communication system, can be connected to a bank network or bank server. The communication system between the dispenser and the bank network allows a customer to have full access of ones bank account. The customer can use the fuel dispenser for making fund transactions, pay for fuel, pay for convenient store items and fast food, a car wash, wire funds, transfer between accounts, pay bills, make deposits, and any other banking transaction. In addition, since the fuel dispenser operates as a fully functional ATM machine, a customer is able to receive cash/legal tender as one would from a conventional ATM machine.

Yet another advantage of the present invention is that the fuel dispenser can operate as a kiosk device. Operating as a kiosk device, a customer is able to conduct audio/video telecommunications, such as standard telephone, as well as video conferencing. A customer is able to order food or other services. A customer may also obtain assistance on fuel dispenser operation. In addition, a customer may be able to receive road and travel directions, hotel reservations and accommodations. A customer may also connect to the internet for web browsing, as well as e-mail services. Since the kiosk device includes audio/video telecommunication functions, a customer is able to talk with and view a live person through the use of a speaker and a camera located on the fuel dispenser and a complimentary speaker and camera located at a remote location.

Yet another advantage of the present invention is the convenience of one-stop shopping. A customer can purchase and dispense fuel, obtain cash, check and send e-mail, and place and receive personal telephone calls all from a single device.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
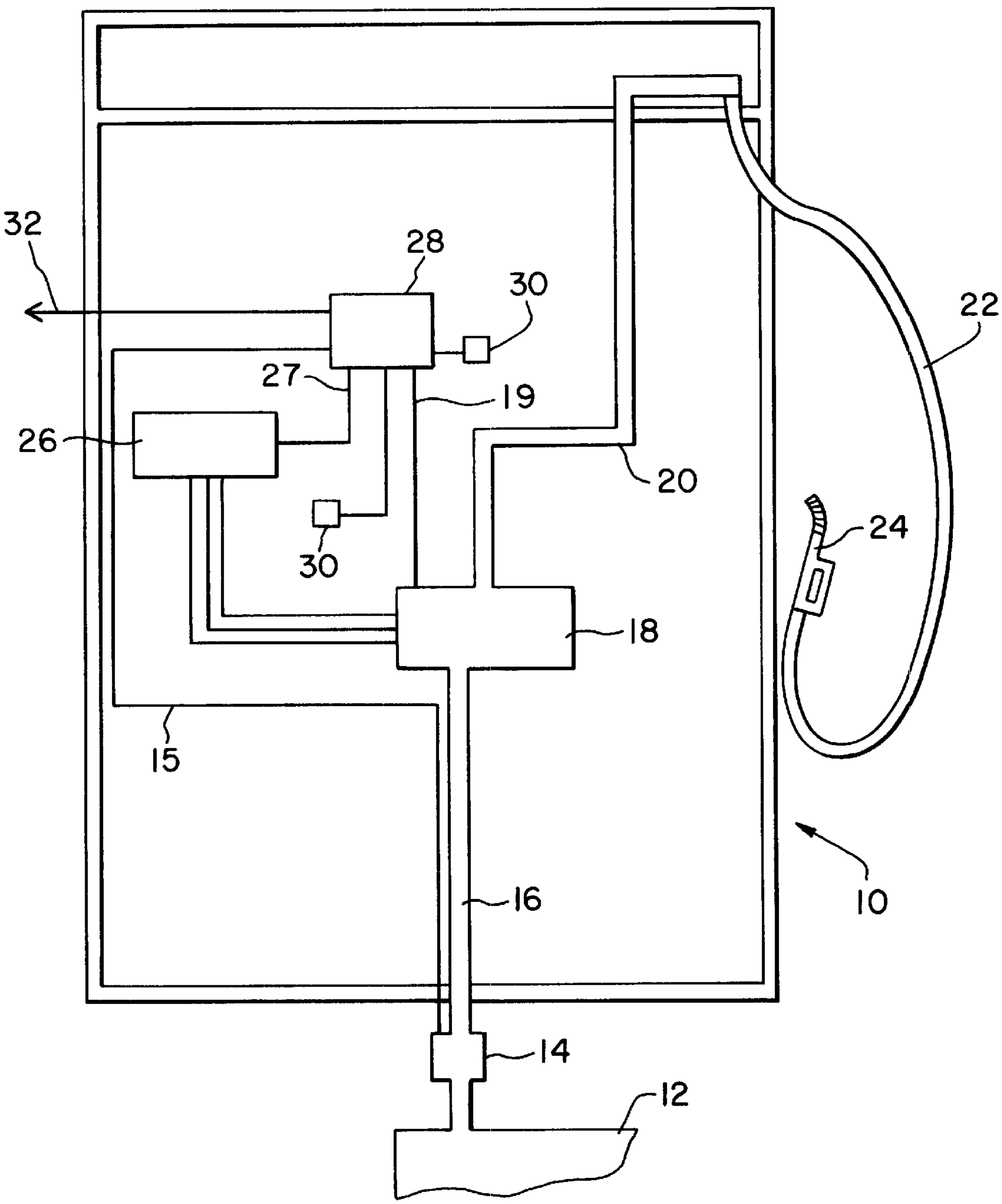
FIG. 1 is a sectional view of a fuel dispenser incorporating the present invention.

Referring now to the drawings and particularly to FIG. 1, there is shown a fuel dispenser 10 which incorporates the present invention. Fuel dispenser 10 includes a fuel dispenser tank 12. A fuel pump 14, when activated, pumps fuel from fuel Lank 12 through fuel supply conduit 16 to meter 18. Meter 18 volumetrically measures the quantity of fuel to be dispensed. The fuel continues from meter 18 through fuel conduit 20 into fuel hose 22 and is dispensed through nozzle 24. Display 26 is used as an output device for displaying information, such as the quantity of the fuel dispensed, the price of the fuel dispensed, and other fuel operational information. In the preferred embodiment, display 26 is a CRT or other video display device capable of displaying graphics, text, and other information.

A processor means 28 controls the functions of various fuel components of fuel dispenser 10. For example, processor means 28 is operatively connected to the fuel components of pump 14 via line 15, meter 18 via line 19, and display 26 via line 27. Processor means 28 runs fuel dispenser system software. The system software is used for controlling the operation of fuel dispenser 10. In addition, processor means 28 may contain diagnostic software for running diagnostics on processor means 28 and/or the various fuel dispenser components, such as pump 14, meter 18, and display 26.

Processor means 28 may comprise any conventional microprocessor or central processing unit (cPu), such as an Intel$^{R}$ 386, 486, Pentium$^{R}$, Pentium Pro$^{R}$, Pentium II$_{R}$; AMD or Cyrix x86 series; Motorola 680 series, and IBM and other's RISC microprocessors. Along with conventional electronic microprocessors, such as those listed above, processor means 28 may operate by optics rather than electrons. In addition, processor means 28 may comprise a plurality of microprocessors or CPU's. Processor means 28 may also comprise memory, such as ROM, RAM, Hard drive, or other memory storage device.

Each of the various fuel dispenser components perform a fuel dispenser component function. For example, pump 14 performs the functions of a fuel pump. Meter 18 performs the function of volumetrically measuring a quantity of fuel to be dispensed. Display 26 displays relevant information for an operator while using dispenser 10. Processor means 28 runs diagnostics on various fuel dispenser components to monitor and diagnose proper fuel dispenser component function. The diagnostic software is used to diagnose fuel dispenser component malfunctions. In addition, the diagnostic software can be used to diagnose malfunctions of the fuel dispenser system software.

Remote connection means 32 is used for communication between processor means 28 and a remote telecommunication device for telecommunication. Remote communication means 32 can be any system by which one can connect a computer/CPU to a remote telecommunication device. Such remote means 32 includes, but is not limited to, traditional phone lines, wireless phone, cellular phone technology, satellite phone, direct internet, or microwave transmission.

Figure 2:
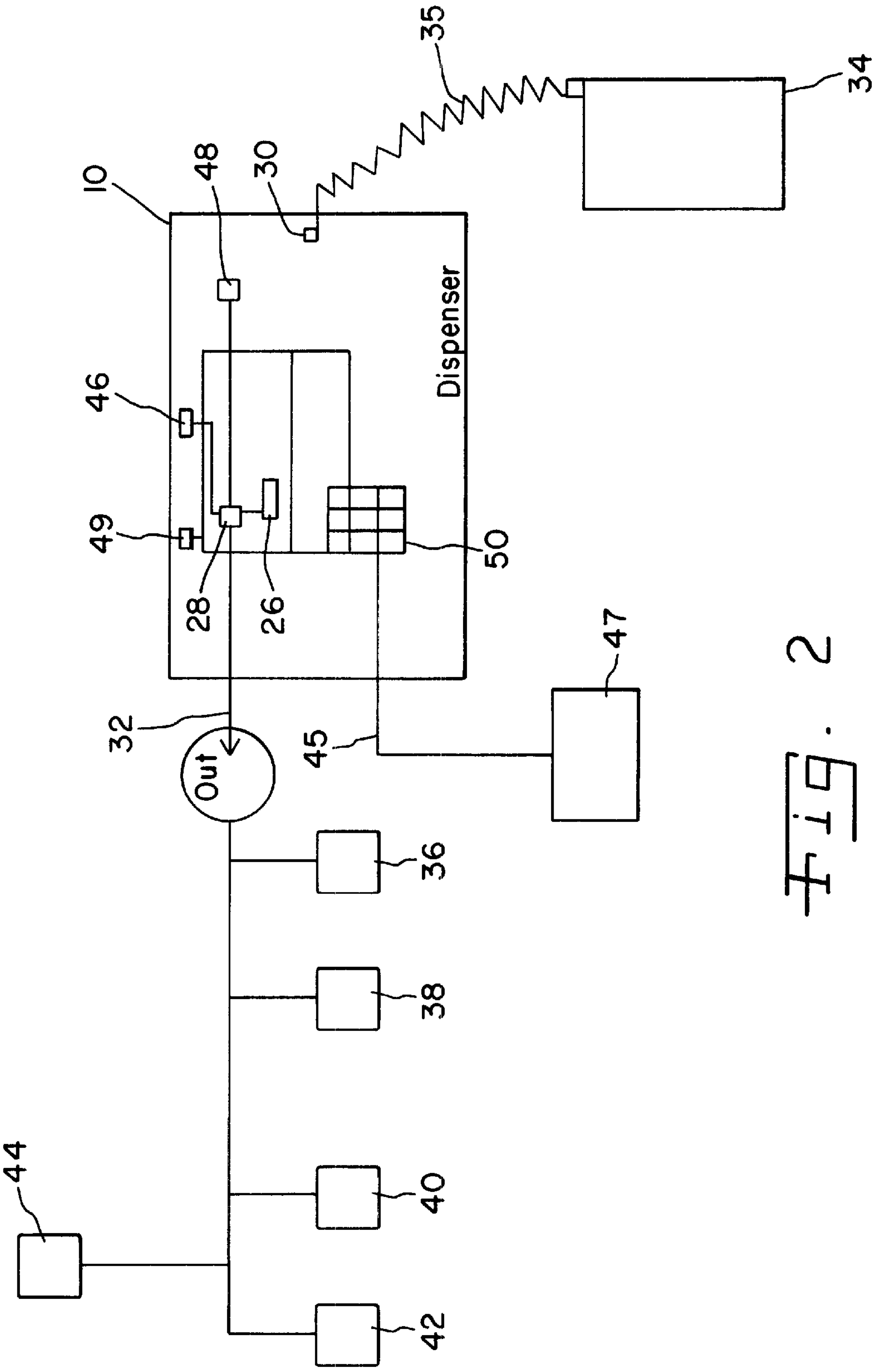
FIG. 2 is a diagrammatic view of a remote addressable fuel dispenser system of the present invention.

Referring now to FIG. 2, a wireless input port 30 is located on a face of or the exterior of dispenser 10 for communication between dispenser 10 and a wireless input device. Wireless input device 34 is in wireless communication with wireless input port 30 by wireless communication means 35. Wireless input device 34 can be any wireless peripheral, such as but not limited to, a keyboard, mouse, hand-held/palm-held device, or notebook computer. Wireless input device 34 may be used by an operator during fuel dispenser diagnostics. In addition, wireless input device 34 may be used during fuel dispenser system software updates. Wireless input communication means 35 can be any wireless communication/transmission, such as but not limited to, infrared (IR) transmission, radio frequency (RF) transmission, and fiber optics.

Wireless input communication means 35 permits a communication between wireless peripheral device, such as a wireless input device 34 to wireless input port 30 without a physical wired connection. Since volatile fuels may be present in and around a fuel dispenser, it is advantageous not to have a direct electrical wired connection where a peripheral device cable mates with a wire-interface port.

Fuel dispenser 10 can be in direct communication with various telecommunication devices. Remote communication means 32 provides for direct communication without an intermediary computer server or central processor unit between the dispenser's CPU or processor 28 and a remote telecommunication device.

Fuel dispenser 10 is remotely addressable for direct communication between fuel dispenser 10 and a remote telecommunication device. The direct communication allows one to "call-in", log-in, or otherwise access the fuel dispenser from a remote location. The communication is made directly to fuel dispenser 10 and without going through a point-of-sale (POS) computer/server.

The remote telecommunication device can be telephone 36; remote maintenance source, such as a remote computer 38; the internet 40; a convenient store work station 42; and a banking network or computer 44. Processor 28 also is connected by line 45 to point-of-sale computer 47. Point-of-sale computer 47 is typically located inside a convenient store of a service station. The point-of-sale computer 47 is used by a service station attendant to monitor and control various aspects of the pay-at-the-pump and fueling transaction. Fuel dispenser 10 also contains other pay-at-the-pump components, such as swipe credit card or ATM card reader (not shown).

Fuel dispenser 10 also contains camera 46 and microphone 48. Camera 46 and microphone 48 are used for various telephony and telecommunication functions of fuel dispenser 10.

During the operation of the present invention, a customer is able to use fuel dispenser 10 similarly to a conventional fuel dispenser. A customer is able to dispense fuel into ones vehicle. In order to operate the fuel dispenser and pay-at-the-pump system, customer inputs the necessary information on a numeric keypad 50.

In addition to conventional fuel dispenser functions, a customer can use fuel dispenser 10 as a telecommunication device. Fuel dispenser 10 can operate as a standard telephone. The user can use the pay-at-the-pump touchpad 50 for inputting the digits of the telephone number. The user speaks into microphone 48 and hears the party to whom the operator is speaking through speaker 49. Alternatively, fuel dispenser 10 may include a more traditional telephone handset and other input devices. Such input devices may include additional buttons or a touch screen display (not shown).

In addition, fuel dispenser 10 contains advanced telephony functions. Fuel dispenser 10 can operate as an audio/video telephony device. The image of the initiator of the phone call is captured by camera 46 and the audio is captured by microphone 48. The recipient on the other end of the telephony connection would be displayed on display 26 and the audio through speaker 49.

A user can use the telephony function of fuel dispenser 10 in order to communicate, via audio and video, with a convenient store clerk or fuel station personnel. A customer is then able to transact business with the clerk, such as ordering food, purchasing merchandise, and receiving directions or instructions. These directions or instructions could include operation of the fuel dispenser 10. In addition, the telephony function can be used by a user to gain useful information regarding road directions, hotel accommodations, hotel reservations, automotive service station locations, among other things. In addition, the telephony function could connect the dispenser and customer to a customer service agent to gain information relevant to fuel dispenser 10 operation or other customer service information.

Fuel dispenser 10 may contain means for generating assistance information. The means for generation assistance information could be a software or hardware based agent. The assistance information can be located on a remote location such as remote server 38. The information is then communicated to fuel dispenser 10 through remote communication means 32. Alternatively, the means for generating assistance information could be by a human being. A person at a remote location using a telecommunication device can be in communication with fuel dispenser 10 through a remote communication means 32. That remote person could communicate with the fuel dispenser operator, to give the fuel dispenser operator assistance in fuel dispenser operation, or other relevant information.

Fuel dispenser 10 may also operate as a fully functional ATM (automatic teller machine). By using a pay-at-the-pump card swipe system, an operator is able to swipe his or her ATM card. The operator is then able to enter banking information, such as a PIN number and other banking transactional information via the pay-at-the-pump numeric keyboard 50. An operator of fuel dispenser 10 can transact any business one would do using a traditional ATM machine. Fuel dispenser 10 also dispenses cash or legal tender as a standard ATM machine would through a cash slot and deposits may be made through a deposit slot (not shown). The built-in ATM functions allow a customer to have one-stop-shopping for pumping fuel and transacting financial/banking business.

The telecommunication functions of fuel dispenser 10 also includes operating as a kiosk. As a kiosk, fuel dispenser 10 can be used for connecting to the internet 40. An operator is able to use the kiosk function to check and send e-mail and access other information on the Internet, the World Wide Web, and other computer networks.

In addition to the other telecommunication functions, remote communication means 32 is used for direct communication between processor 28 and a remote maintenance source, such as remote computer 38. Alternatively, a remote maintenance source can be a remote source or device for use during fuel dispenser 10 diagnostic.

Remote computer 38 may contain remote diagnostic software for fuel dispenser 10. A technician at a remote or off-site can use remote computer 38 to access fuel dispenser 10 through the remote communication means 32. The off-site technician can upload information pertinent to a fuel dispenser component function for component diagnostics. In addition, an off-site is remote technician can download updates of system software and system diagnostic software from remote computer 38 through remote communication means 32.

A technician on-site, at the fuel dispenser, can initiate fuel dispenser 10 diagnostics. The on-site technician can use wireless input device 34 during fuel dispenser component and system software diagnostics. In addition, the on-site technician has access to the most current system diagnostics through the use of the remote communication means 32, which provides communication between the processor 28 and remote computer 38. The on-site technician can initiate the upload of data from fuel dispenser 10 (individual fuel dispenser components, components'functions and system and diagnostic software) to remote computer 38. Similarly, the on-site technician can download data; and system and diagnostic software upgrades from remote computer 38 to processor 28.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A remote addressable fuel dispenser system for fuel dispenser diagnostics and remote telecommunication, comprising:

at least one fuel dispenser component;

a processor means, said processor means operably connected to said at least one fuel dispenser component, said processor means running dispenser system software;

wireless input device, said wireless input device including at least one operational functionality relating to dispenser system diagnostics; and wireless input communication means for operatively communicating said wireless input device with said processor means.

2. The remote addressable fuel dispenser according to claim 1, further comprising:

a remote communication means for remote telecommunication.

3. The remote addressable fuel dispenser according to claim 2, further comprising:

a remote telecommunication device, said remote telecommunication device in operable communication with said processor means by said remote communication means.

4. The remote addressable fuel dispenser according to claim 3 wherein said remote telecommunication device capable of audio and video transmission.

5. The remote addressable fuel dispenser according to claim 4 further comprising:

means for generating assistance information; said means for generating assistance information being provided via said remote telecommunication device.

6. The remote addressable fuel dispenser according to claim 3 wherein said remote telecommunication device is one of a bank server and a bank computer network.

7. The remote addressable fuel dispenser according to claim 3 further comprising:

means for generating assistance information; said means for generating assistance information being provided via said remote telecommunication device.

8. The remote addressable fuel dispenser according to claim 6 wherein said remote communication means is wireless communication.

9. The remote addressable fuel dispenser according to claim 8, further comprising:

a remote telecommunication device, said remote telecommunication device in operable communication with said processor means by said remote communication means.

10. The remote addressable fuel dispenser according to claim 1, further comprising:

a remote communication means for fuel dispenser diagnostics.

11. The remote addressable fuel dispenser according to claim 10 further comprising:

a remote maintenance source for fuel dispenser diagnostics; said remote maintenance source in operable communication with said processor means by said remote communication means.

12. The remote addressable fuel dispenser according to claim 11 further comprising;

said at least one fuel dispenser component performing at least one fuel dispenser component function; and said remote maintenance source is used during diagnostics of said at least one fuel dispenser component function.

13. The remote addressable fuel dispenser according to claim 11, wherein said remote maintenance source is used during updates of said dispenser system software.

14. The remote addressable fuel dispenser according to claim 11, wherein said remote communication means facilitates updates of said dispenser system software.

15. The remote addressable fuel dispenser according to claim 1, wherein said wireless input communication means operates by Infrared (IR) transmission.

16. The remote addressable fuel dispenser according to claim 1, wherein said wireless input communication means operates by radio frequency (RF) transmission.

17. The remote addressable fuel dispenser according to claim 1, further comprising:

said at least one fuel dispenser component performing at least one fuel dispenser component function; and said wireless input device is used while performing diagnostics of said at least one fuel dispenser component function.

18. The remote addressable fuel dispenser according to claim 1, wherein said wireless input device is used while performing diagnostics of said dispenser system software.

19. The remote addressable fuel dispenser according to claim 1, further comprising;

fuel dispenser operation data; and said at least one fuel dispenser component includes a display for output of fuel dispenser operational data.

20. The remote addressable fuel dispenser system according to claim 1, wherein said wireless input device is a wireless keyboard.

21. The remote addressable fuel dispenser system according to claim 1, wherein said wireless input device is a mouse.

22. The remote addressable fuel dispenser system according to claim 1, wherein said wireless input communication means is a fiber optic connection.

23. A remote addressable fuel dispenser system for fuel dispenser diagnostics and remote telecommunication, comprising:

at least one fuel dispenser component;

a processor means, said processor means in operable communication with said at least one fuel dispenser component, said processor means running dispenser system software;

remote communication means for telecommunication; and at least one remote facility, said at least one remote facility being operatively configured for communication with said processor means using said remote communication means, at least one of said at least one remote facility being operatively configured to enable the performance of fuel dispensing transaction related tasks and non-fuel dispensing transaction related tasks involving said processor means and the at least one remote facility.

24. The remote addressable fuel dispenser according to claim 23, wherein said at least one remote facility further comprising:

a remote telecommunication device, said remote telecommunication device in operable communication with said processor means by said remote communication means.

25. The remote addressable fuel dispenser according to claim 24 wherein said remote telecommunication device capable of audio and video transmission.

26. The remote addressable fuel dispenser according to claim 25 further comprising:

means for generating assistance information; said means for generating assistance information being provided via said remote telecommunication device.

27. The remote addressable fuel dispenser according to claim 24 wherein said remote telecommunication device is a remote maintenance source for use during fuel dispenser diagnostics.

28. The remote addressable fuel dispenser according to claim 24 wherein said remote telecommunication device is a remote maintenance source for use during dispenser system software diagnostics.

29. The remote addressable fuel dispenser according to claim 24 wherein said remote telecommunication device is one of a bank server and a bank computer network.

30. The remote addressable fuel dispenser according to claim 24 further comprising:

means for generating assistance information; said means for generating assistance information being provided via said remote telecommunication device.

31. The remote addressable fuel dispenser according to claim 23 wherein said remote communication means is wireless communication.

32. The remote addressable fuel dispenser according to claim 31, wherein said at least one remote facility further comprising:

a remote telecommunication device, said remote telecommunication device in operable communication with said processor means by said remote communication means.

33. The remote addressable fuel dispenser according to claim 32 wherein said remote telecommunication device is a remote maintenance source for use during fuel dispenser diagnostics.

34. The remote addressable fuel dispenser according to claim 23, further comprising;

fuel dispenser operation data; and said at least one fuel dispenser component includes a display for output of fuel dispenser operational data.

35. A remote addressable fuel dispenser system for fuel dispenser diagnostics and remote telecommunication, comprising:

at least one fuel dispenser component;

a processor means, said processor means in operable communication with said at least one fuel dispenser component, said processor means running dispenser system software; and remote communication means for use during fuel dispenser diagnostics, said remote communication means being operatively configured to perform dispenser system diagnostic operations.

36. The remote addressable fuel dispenser according to claim 35, further comprising:

said at least one fuel dispenser component performing at least one fuel dispenser component function; and said remote communication means is used during diagnostics of said at least one fuel dispenser component function.

37. The remote addressable fuel dispenser according to claim 35, wherein said remote communication means is used during diagnostics of said dispenser system software.

38. The remote addressable fuel dispenser according to claim 35, further comprising;

fuel dispenser operation data; and said at least one fuel dispenser component includes a display for output of fuel dispenser operational data.

39. A remote addressable fuel dispenser system for fuel dispenser diagnostics and remote telecommunication, comprising:

at least one fuel dispenser component;

a microprocessor, said microprocessor operably connected to said at least one fuel dispenser component, said microprocessor running dispenser system software;

wireless input device, said wireless input device including at least one operational functionality relating to dispenser system diagnostics; and wireless input communication between said wireless input device and said microprocessor.

40. A remote addressable fuel dispenser system for fuel dispenser diagnostics and remote telecommunication, comprising:

at least one fuel dispenser component;

a microprocessor, said microprocessor in operable communication with said at least one fuel dispenser component, said microprocessor running dispenser system software; and remote communication means for use during fuel dispenser diagnostics, said remote communication means being operatively configured to perform dispenser system diagnostic operations.

41. A remote addressable fuel dispenser system for fuel dispenser diagnostics and remote telecommunication, comprising:

at least one fuel dispenser component;

a microprocessor, said microprocessor in operable communication with said at least one fuel dispenser component, said microprocessor running dispenser system software;

remote communication for telecommunication; and at least one remote facility, said at least one remote facility being operatively configured for communication with said microprocessor using said remote communication, at least one of said at least one remote facility being operatively configured to enable the performance of fuel dispensing transaction related tasks and non-fuel dispensing transaction related tasks involving said microprocessor and the at least one remote facility.

* * * * *